(No Model.)  3 Sheets—Sheet 1.

J. W. MEYER.
MACHINE FOR MAKING PASTE.

No. 457,616.  Patented Aug. 11, 1891.

Witnesses:

Inventor:

(No Model.) 3 Sheets—Sheet 2.
J. W. MEYER.
MACHINE FOR MAKING PASTE.

No. 457,616. Patented Aug. 11, 1891.

Witnesses:
E. P. Ellis
J. M. Nesbit

Inventor
Jno. W. Meyer
per
Lehmann & Pattison,
Attys (No Model.) 3 Sheets—Sheet 3.
J. W. MEYER.
MACHINE FOR MAKING PASTE.

No. 457,616. Patented Aug. 11, 1891.

Witnesses:
E. P. Ellis
J. M. Nesht.

Inventor
Jno. W. Meyer
per
Lehmann & Pattison
Atty's.

UNITED STATES PATENT OFFICE.

JOHN W. MEYER, OF ROCK ISLAND, ILLINOIS, ASSIGNOR TO THOMAS J. RODMAN.

MACHINE FOR MAKING PASTE.

SPECIFICATION forming part of Letters Patent No. 457,616, dated August 11, 1891.

Application filed October 14, 1890. Serial No. 368,099. (No model.)

*To all whom it may concern:*

Be it known that I, JOHN W. MEYER, of Rock Island, in the county of Rock Island and State of Illinois, have invented certain new and useful Improvements in Machines for Making Paste; and I do hereby declare the following to be a full, clear, and exact description of the invention, such as will enable others skilled in the art to which it pertains to make and use it, reference being had to the accompanying drawings, which form part of this specification.

My invention relates to an improvement in machines for making paste; and it consists in the combination and arrangement of parts, which will be fully described hereinafter.

The object of my invention is to produce a mechanism by means of which the raw materials are taken, converted into paste, and the paste cooked, and then discharged into suitable receptacles in one continuous operation, thus entirely doing away with the necessity of the ingredients being brought together and mixed in the usual manner.

Figure 1:
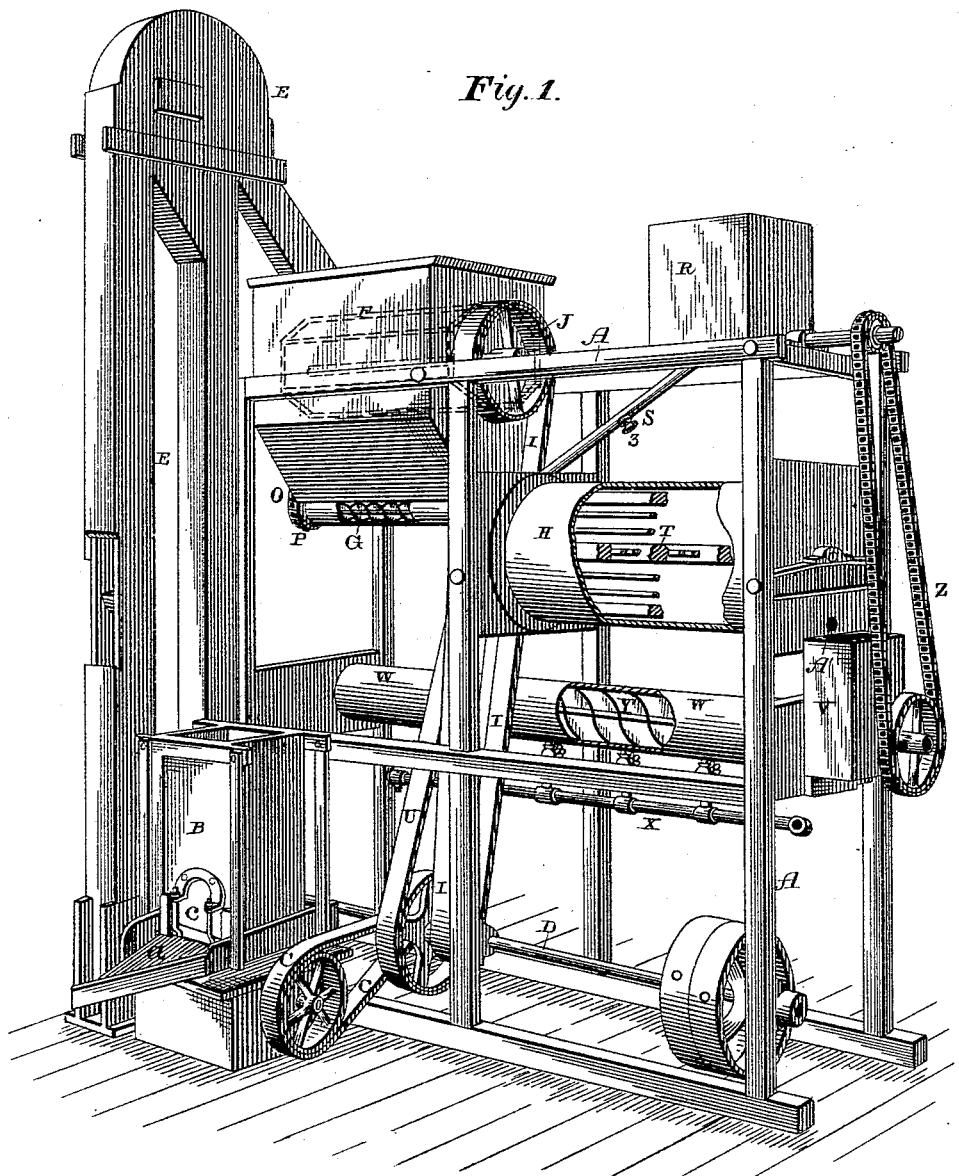
Figure 2:
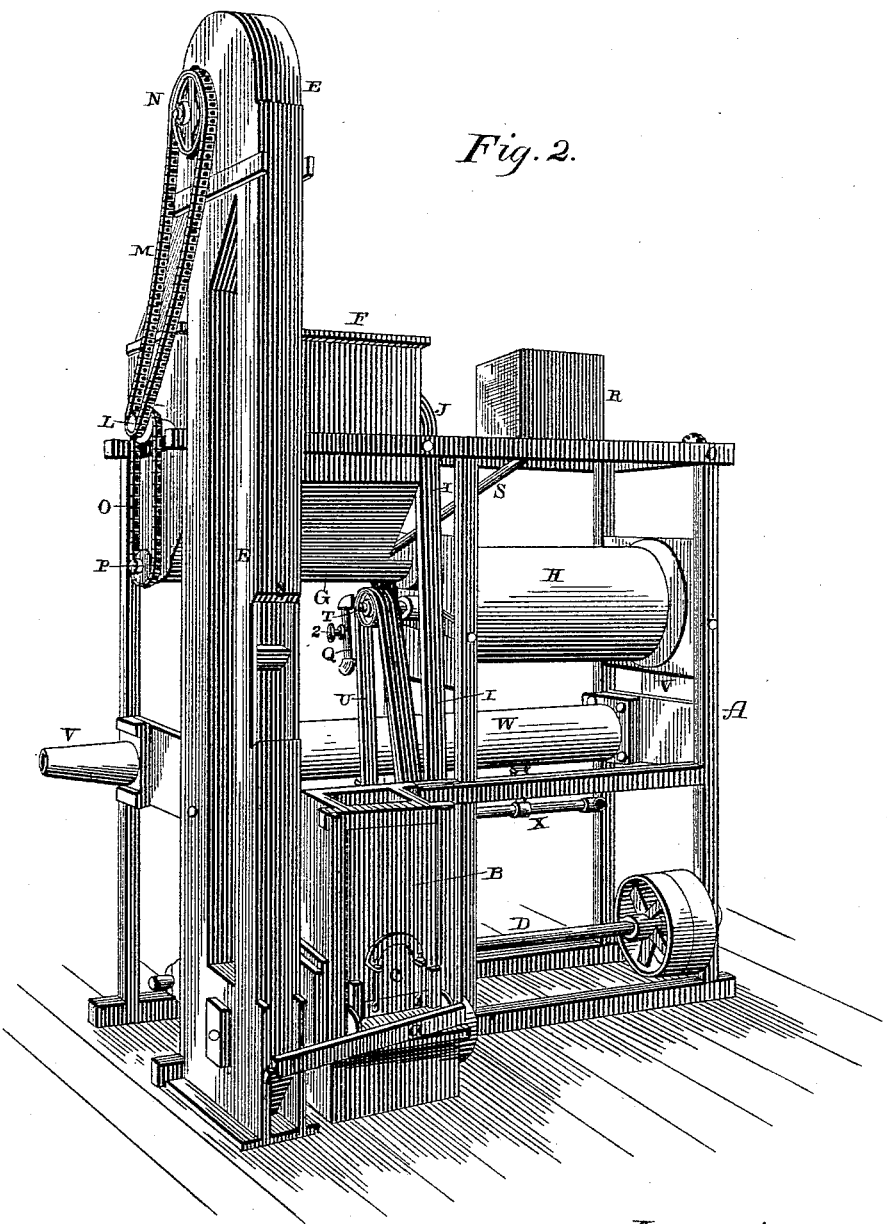
Figure 3:
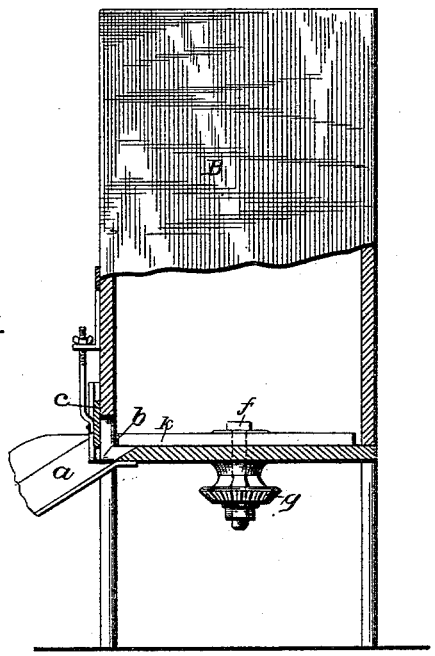
Figure 4:
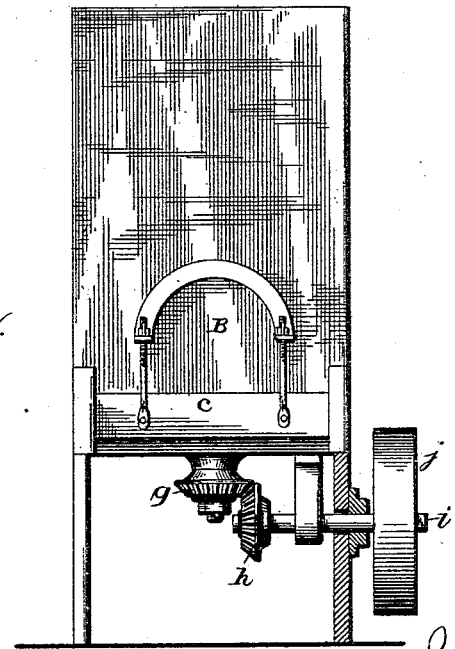

Figures 1 and 2 are perspectives taken from opposite sides of the machine, and shown partly in section. Fig. 3 is an enlarged detached side view of the bin B, partly in section. Fig. 4 is an enlarged front view of the same.

A represents a suitable frame-work of any suitable description and in which the operating parts are placed. To one side of this frame-work is placed a flour bin or holder B, which is provided with a short shaft $f$, to the lower end of which is secured a gear-wheel $g$, which meshes with a gear-wheel $h$ upon a shaft $i$, to the opposite end of which shaft a pulley $j$ is secured, and around which a driving-belt C passes. Secured to the upper end of the short shaft $f$, inside of the bin B, are a suitable number of blades or stirrers $k$, which force the flour from the bin through an opening $b$, made in its front lower edge, upon an inclined chute or trough $a$, which directs it to the lower end of the elevator. The amount of flour forced from the bin is regulated by means of an adjustable gate $c$, by means of which the opening $b$ is enlarged and contracted.

I do not limit myself in regard to the construction of the device for ejecting the flour from the bin or holder, for this may be of any desired construction, so long as it is capable of being adjusted so as to feed the flour in regulated quantities. The flour is raised by the elevator E, and discharged from its top into the revolving sieve F, of any suitable construction, and which is driven by the belt I, which extends from the driving-shaft D up around the pulley J, placed upon the sieve-shaft. To the opposite end of the sieve-shaft is secured a sprocket-wheel L, from which extends a sprocket-chain M up over the sprocket-wheel N, by means of which the elevator is operated. The flour, after passing through the sieve, is forced by the conveyer G into the mixer H, the conveyer being driven by a sprocket-chain O, which extends from the sprocket-wheel L around the sprocket-wheel P upon the end of the conveyer-shaft. As the flour is discharged by the conveyer G into the mixer H a suitable quantity of either hot or cold water is forced into the mixer through the pipe Q, which is connected with any suitable supply, and this pipe is provided with a valve 2 for regulating the amount of water fed through it, and at the same time a suitable quantity of chemical liquid for preserving the paste is discharged into the mixer H from a reservoir R through the pipe S, which is provided with a valve 3, so as to regulate the amount of chemicals that shall be fed into the mixer. Through the mixer-cylinder H extends a shaft T, which is provided with a pulley, around which a belt U from the driving-shaft D passes. Secured to this shaft T, inside of the cylinder H, are suitable heads, to which beater arms or rods are fastened for the purpose of mixing the flour, water, and chemicals thoroughly together into a paste. The paste is discharged from the mixer H through the box V into the cooking-cylinder W, into which steam is admitted in any suitable quantities from the pipe X, which is connected with a boiler or other source of supply. In this cooker W is placed a conveyer Y, by means of which the paste is forced from the end of the cooker at V and discharged into barrels, bags, or other receptacles placed to receive it. The conveyer Y is operated by the sprocket-chain Z, which extends from the sieve-shaft around a sprocket-wheel upon the conveyer-shaft, as shown. The paste while passing through the cooker W is thoroughly cooked, and when it is discharged therefrom it is ready for use.

From the above it will be seen that it is only necessary to place the flour in the bin B and then regulate the supply of water and chemicals, turn on the steam into the cooker, and then start the steam into operation, and perfectly-cooked paste will be discharged from the machine in one continuous flow. As the paste is mixed and cooked by machinery, it can be made in unlimited quantities and much more cheaply and rapidly than can be done where the different ingredients are mixed and handled in the usual manner.

I do not make any claim in this application for the process carried out by the machine herein described, as this is made the subject-matter of a concurrent application, Serial No. 379,275, filed January 27, 1891.

Having thus described my invention, I claim—

1. In a machine for mixing paste, the combination of a bin or holder for the flour, an elevator connected thereto and into which the flour is discharged from the bin in regulated quantities, a sieve into which the flour is discharged from the elevator, a mixer into which the flour is discharged from the sieve, a pipe or pipes for the introduction of a liquid into the mixer, a cooker into which steam is admitted for the purpose of cooking the paste, and a means for forcing the paste from the cooker, whereby the paste is made by one continuous action, substantially as shown.

2. The combination of the bin B, provided with a device for ejecting the flour therefrom, an elevator E, connected to the bin, the revolving sieve, a conveyer placed below the sieve, the mixing-cylinder, the mixer placed inside thereof, the box V, placed at the end of the mixer, the cooker W, the conveyer placed therein, the steam and water pipes, and a suitable driving mechanism, substantially as described.

3. In a machine for manufacturing paste, the combination of a mixer, a pipe connected with the mixer for feeding liquid thereto in regular quantities, a conveyer for feeding flour to the mixer in regular quantities, a means for feeding flour to the conveyer, and a cooker into which the mixed flour and water are fed, whereby flour is converted into paste by a continuous process, substantially as specified.

4. In an apparatus for producing paste by a continuous process, the combination of a mixer, a pipe connected with the mixer for feeding water thereto, the mixer having an inlet-opening at one end to receive flour and an outlet-opening at its opposite end, a conveyer for feeding flour to the said inlet, a means for feeding flour to the conveyer, a cooker having an inlet-opening at one end to receive the mixed materials from the mixer-outlet, and an outlet-opening at its opposite end, through which the finished paste is fed, the parts combined substantially as described.

In testimony whereof I affix my signature in presence of two witnesses.

JOHN W. MEYER.

Witnesses:
LOUIS V. EKHART,
JOHN EDDY.